United States Patent
Kinoshita et al.

(10) Patent No.: US 6,309,558 B1
(45) Date of Patent: Oct. 30, 2001

(54) PROCESS OF FABRICATING A MANGANESE-ZINC-FERRITE CORE, AND MANGANESE ZINC-BASE FERRITE CORE

(75) Inventors: Yukiharu Kinoshita; Hiroyasu Takahashi; Jun Sawai, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/625,363

(22) Filed: Jul. 25, 2000

Related U.S. Application Data

(63) Continuation of application No. PCT/JP99/06532, filed on Nov. 24, 1999.

(30) Foreign Application Priority Data

Nov. 25, 1998 (JP) .................................................. 10-350765
Mar. 19, 1999 (JP) .................................................. 11-076447
Nov. 19, 1999 (JP) .................................................. 11-329865

(51) Int. Cl.$^7$ ............................. C04B 35/36; H01R 1/34; H01R 41/02
(52) U.S. Cl. ................................... 252/62.62; 252/62.63; 264/613
(58) Field of Search .............................. 252/62.62, 62.63; 264/613

(56) References Cited

U.S. PATENT DOCUMENTS 4,104,549   8/1978   Akimoto et al. ....................... 310/26

FOREIGN PATENT DOCUMENTS

| | | |
|---|---|---|
| 6-1193404 | 8/1986 | (JP) . |
| 2-21187 | 1/1990 | (JP) . |
| 4-354304 | 12/1992 | (JP) . |
| 5-275225 | 10/1993 | (JP) . |
| 6-295812 | 10/1994 | (JP) . |
| 8-138949 * | 5/1996 | (JP) . |
| 10-22113 | 1/1998 | (JP) . |
| 10-208926 * | 8/1998 | (JP) . |

OTHER PUBLICATIONS abstract for WO00/31000, Jun. 2, 2000.*
First page of WO 00/31000, Jun. 2, 2000.*
First page of JP 2000–340,419, Dec. 8, 2000.*
English abstract for JP 2000–340,419.*

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

The present invention provides manganese-zinc-ferrite core fabrication process which can fabricate a manganese-zinc-ferrite core having high surface electrical resistance and low magnetic core losses without recourse to the introduction of nitrogen gas from the outside yet within a short time period, and such a manganese-zinc-ferrite core. To achieve this, manganese-zinc-ferrite core is formed into a given core shape. The core compact is fired in a firing atmosphere having an oxygen concentration controlled with carbonic acid gas and steam. Then, the compact is rapidly cooled at a cooling rate of 350° C./hour to 850° C./hour. In this way, a manganese-zinc-ferrite core is obtained.

16 Claims, No Drawings

(1) PROCESS OF FABRICATING A MANGANESE-ZINC-FERRITE CORE, AND MANGANESE ZINC-BASE FERRITE CORE

This application is a Continuation of international application No. PCT/JP99/06532, filed on Nov. 24, 1999.

BACKGROUND OF THE INVENTION

1. Field of the Invention

The present invention relates to a process of fabricating a manganese-zinc-ferrite core for deflecting yokes or transformers and coils, and such a manganese-zinc-ferrite core.

2. Description of the Background

CRT display monitors and televisions now on the market have increasingly larger screens and achieve ever-higher frequencies. Accordingly, there is a strong demand for the development of a ferrite material for deflecting yokes, which has even higher electromagnetic properties than those of conventional ferrite materials, for example, ever-higher permeability and saturation flux densities and ever-lower magnetic core losses. Magnesium-zinc-ferrite has been used as such a ferrite material for deflecting yokes. However, magnesium-zinc-ferrite places has an inherent limit on the electromagnetic properties thereof and so generates much heat due to magnetic core losses when used in the form of a core. Thus, it is often difficult to use such ferrite for a deflecting yoke core used for large screens, wide-angle deflection, and high frequencies.

Among ferrite cores known to have high permeability, high saturation flux densities and low magnetic core losses, there is a manganese-zinc-ferrite core containing 50 mol % or more of $Fe_2O_3$. However, this core is disadvantageous in that its surface electrical resistance is low and it cannot ensure inter-winding insulation. Thus, there is a steady demand for a ferrite core having high surface electrical resistance and low magnetic core losses.

With the progression of low-profile electronic equipment, transformers and coils, too, are now required to be increasingly thin. In such applications, manganese-zinc-ferrite cores containing 50 mol % or more of $Fe_2O_3$ and having low magnetic core losses have so far been used. For such manganese-zinc-ferrite cores containing 50 mol % or more of $Fe_2O_3$, however, it is difficult to achieve much more thickness reductions because an insulating bobbin must be used to wind wires therearound due to their low surface electrical resistance.

For this reason, transformers or coils obtained by providing wires directly around a nickel-zinc-ferrite core of high surface electrical resistance without recourse to any insulating bobbin have so far been developed, thereby achieving much more thickness reductions. In this case, however, there is also a problem that magnetic core losses must be sacrificed due to the use of the nickel-zinc-ferrite core.

In this context, too, there is a demand for a ferrite core having high surface electrical resistance and low magnetic core losses.

While the problem with the manganese-zinc-ferrite containing 50 mol % or more of $Fe_2O_3$ has been explained, it is understood that this problem holds more or less for manganese-zinc-ferrite containing less than 50 mol % of $Fe_2O_3$. It is noted, however, that as the amount of $Fe_2O_3$ decreases, the problem becomes gradually insignificant.

To increase the surface electrical resistance of the aforesaid manganese-zinc-ferrite core containing 50 mol % or more of $Fe_2O_3$, for instance, JP-A 6-295812 describes a process for subjecting a manganese-zinc-ferrite core containing 50 mol % or more of $Fe_2O_3$ to an oxidizing treatment, thereby forming an electrical insulating layer on the surface thereof. According to this process, it is possible to obtain a manganese-zinc-ferrite core having low magnetic core losses and high surface electrical resistance. With this magnetic core, much more thickness reductions can be achieved because wires can be wound directly around the core.

However, the aforesaid conventional process of fabricating a manganese-zinc-ferrite core containing 50 moles or more of $Fe_2O_3$ is now found to have the following problems.

(A) An extended time is needed for the formation of the aforesaid electrical insulating layer, resulting in fabrication cost increases. For instance, the "means for solving the problem" in the above publication describes that cooling to 900° C. is carried at a rate of about 75° C. per hour after the completion of firing (at a firing temperature of 1,250° C.). Thus, about 4.7 hours are required for cooling down to 900° C., i.e., a temperature drop of 350° C. At 900° C. or lower, cooling is carried out at a rate of 300° C. per hour and air is introduced between 700° C. and 400° C. to form an electrical insulating layer. Assuming that the outlet temperature of the furnace is 100° C., a cooling time of about 7.5 hours is needed. When the electrical insulating layer is formed under such oxidizing conditions, it is likely to crack.

(B) In the process disclosed in the above publication, a low-oxygen-concentration atmosphere using nitrogen gas is used as the firing atmosphere. However, the introduction of nitrogen gas from the outside adds some cost to the magnesium-zinc-ferrite core currently used as a deflecting yoke core and obtained by firing without recourse to the introduction of nitrogen gas from the outside.

SUMMARY OF THE INVENTION

Accordingly, it is an object of the present invention to provide a manganese-zinc-ferrite core fabrication process which can fabricate a manganese-zinc-ferrite core having high surface electrical resistance and low magnetic core losses without recourse to the introduction of nitrogen gas from the outside yet within a short time period, and such a manganese-zinc-ferrite core.

Such an object is now surprisingly achieved by the particular embodiments of the invention defined below as (1) to (9).

(1) A process of fabricating a manganese-zinc-ferrite core by forming manganese-zinc-ferrite into a given core shape, firing a core compact in a firing atmosphere having an oxygen concentration controlled by carbon dioxide and steam, and cooling said core compact at a cooling rate of 250° C./hour to 850° C./hour.

(2) The manganese-zinc-ferrite core fabrication process according to (1) above, wherein said cooling rate is between 300° C./hour and 850° C./hour.

(3) The manganese-zinc-ferrite core fabrication process according to (1) or (2) above, wherein said manganese-zinc-ferrite contains iron oxide as a main component in an amount of 50 mol % or greater as calculated on an $Fe_2O_3$ basis.

(4) The manganese-zinc-ferrite core fabrication process according to any one of (1) to (3) above, wherein said manganese-zinc-ferrite contains calcium oxide as a subordinate component in an amount of 0.04% by weight to 0.6% by weight as calculated on a CaO basis.

(5) The manganese-zinc-ferrite core fabrication process according to any one of (1) to (4) above, wherein said manganese-zinc-ferrite further contains vanadium oxide as a subordinate component in an amount of 0% by weight to 0.2% by weight as calculated on a $V_2O_5$ basis.

(6) The manganese-zinc-ferrite core fabrication process according to any one of (1) to (5) above, wherein said rapid cooling is carried out by introducing air into said firing atmosphere.

(7) The manganese-zinc-ferrite core fabrication process according to any one of (1) to (6) above, wherein the oxygen concentration of said firing atmosphere controlled by said carbon dioxide and steam is between 5% and 21%.

(8) The manganese-zinc-ferrite core fabrication process according to any one of (1) to (7) above, wherein a combustion off-gas from a heat source is used as said carbon dioxide.

(9) A manganese-zinc-ferrite core fabricated by a manganese-zinc-ferrite core fabrication process as recited in any one of (1) to (8) above, which has a surface electrical resistance of $1\times10^6$ Ω or greater at 500 V and a magnetic core loss of 12 $kW/m^3$ or less at 100° C. and 100 KHz-20 mT.

DETAILED DESCRIPTION OF THE PREFERRED EMBODIMENTS

The manganese-zinc-ferrite in the manganese-zinc-ferrite core according to the present invention may have any desired main component composition. However, the manganese-zinc-ferrite should preferably contain as the main component iron oxide in an amount of 50 mol % or greater, especially between 50.5 mol % and 54 mol %, and more especially between 51.5 mol % and 53.5 mol %, as calculated on an $Fe_2O_3$ basis.

The manganese-zinc-ferrite according to the present invention contains manganese oxide (MnO) and zinc oxide (ZnO) as additional main components. It is then desired that the content of zinc oxide be between 7 mol % and 21 mol %, and preferably between 12 mol % and 17 mol % as calculated on a ZnO basis, with the balance being manganese oxide (MnO).

The manganese-zinc-ferrite according to the present invention contains as a subordinate component calcium oxide in an amount of 0.04% by weight to 0.7% by weight, and preferably 0.10% by weight to 0.60% by weight as calculated on a CaO basis. Any deviation of the amount of CaO from this range makes it impossible to obtain low magnetic core losses and high surface electrical resistance.

The manganese-zinc-ferrite according to the present invention contains as another subordinate component vanadium oxide in an amount of 0% by weight to 0.2% by weight, and preferably 0.025% by weight to 0.15% by weight as calculated on a $V_2O_5$ basis. By the incorporation of vanadium oxide ($V_2O_5$), low magnetic core losses and high saturation flux densities can be obtained with surface electrical resistance high enough to ensure inter-winding insulation even at low oxygen concentrations, so that the surface of the ferrite core is less susceptible to cracking. However, too much vanadium oxide ($V_2O_5$) renders it difficult to obtain low magnetic core losses.

Presumably, the above subordinate components calcium oxide and vanadium oxide are mainly present at the grain boundaries.

The manganese-zinc-ferrite according to the present invention may contain Si, Nb, W. Co, Ti, Mg, Ta, Cu, for example, as further possible subordinate components. The contents of such subordinate components should preferably account for about 0.01% by weight to about 2% by weight, and especially 0.02% by weight to about 1.8% by weight of the manganese-zinc-ferrite.

How to fabricate the manganese-zinc-ferrite core according to the present invention is a then explained.

First, ZnO is added to powdery oxides of iron and manganese prepared by such an atomizing roasting process as set forth in JP-B 47-11550 or the like, and the materials are then mixed and pulverized together by means of a ball mill or the like. Alternatively, $Fe_2O_3$, $Mn_3O$ and ZnO may be mixed together in a ball mill or the like, calcined, and pulverized in a ball mill or the like according to ordinary powdery metallurgy. The post-pulverization average primary particle size should preferably be of the order of 0.8 μm to 1.7 μm.

It is noted that if the above subordinate components inclusive of CaO and $V_2O_5$ are incorporated in the ferrite, they should preferably be added to the main components prior to pulverization.

After pulverization, the powders are dried, and then formed into the predetermined core shape.

The formed core compact is sintered. The sintering temperature or the compact holding high-temperature should preferably be between 1,270° C. and 1,350° C. although depending on the firing atmosphere used. For the firing or sintering atmosphere, it is desired to use an atmosphere containing oxygen at a concentration of 5% to 21%, preferably 5% to 15%, and more preferably 5% to 10%. At an oxygen concentration of less than 5%, it is impossible to obtain surface electrical resistance high enough to ensure inter-winding insulation. At an oxygen concentration exceeding 21% that is higher than that of air, on the other hand, some added cost is incurred. In the present invention, control of the oxygen concentration in the firing atmosphere is gained using air, carbon dioxide and steam; that is, nothing else than nitrogen in air is used, thereby achieving some considerable reduction in the cost for forming the firing atmosphere. If LPG is used as the heat source for firing and an off-gas resulting therefrom is used as carbon dioxide for control of the oxygen concentration in the above firing atmosphere, it is then possible to achieve further cost reductions.

The sintering time or the time for holding the core compact at high temperature should preferably be between 1 hour and 3 hours. The rate of heating the core compact to the wintering temperature should preferably be between 100° C./hour and 700° C./hour, and especially between 400° C./hour and 700° C./hour.

The rapid temperature drop or rapid cooling of the core compact from the wintering temperature—that is one feature of the present invention—should be carried out at the rate of 250° C./hour to 850° C./hour, preferably 250° C./hour to 800° C./hour and more preferably 300° C./hour to 800° C./hour when calcium oxide and vanadium oxide are added thereto, and at the rate of 300° C./hour to 850° C./hour, preferably 350° C./hour to 800° C./hour and more preferably 400° C./hour to 800° C./hour when calcium oxide is added thereto. At too slow a cooling rate the surface of the manganese-zinc-ferrite core is susceptible to cracking, and at too fast a cooling rate no sufficient surface electrical resistance is obtainable.

The above cooling is carried out by introducing air into the burning atmosphere. By the introduction of air in the burning atmosphere, the oxygen concentration of the atmosphere becomes usually about 21% at 400° C. to 200° C. during this cooling.

In this way, the manganese-zinc-ferrite core of the present invention can be fabricated. The thus fabricated Manganese-zinc-ferrite core can have a high surface electrical resistance of $1 \times 10^6$ Ω or greater at 500 V and a low magnetic core loss of 12 kW/m$^3$ or less at 100° C. and 100 kHz-20 mT, and can serve well as a surface crack-free core. This enables windings to be provided directly around the core, resulting in further size reductions.

In addition, this manganese-zinc-ferrite core can have a high saturation flux density of 270 mT or greater at 100° C. and 1 kHz.

The upper limit to the surface electrical resistance of the manganese-zinc-ferrite core obtained so far according to the present invention is $1 \times 10^{10}$ Ω and especially $5 \times 10^7$ Ω. The lower limit to the magnetic core loss is 1.0 kW/m$^3$ and especially 2.0 kW/m$^3$, and the upper limit to the saturation flux density is approximately 400 mT.

The manganese-zinc-ferrite core according to the present invention should preferably have an average crystal grain size of 15 μm or less. At an average crystal grain size exceeding 15 μm the magnetic core loss becomes large.

Here the average crystal grain size is defined as below.

First, the average of sectional areas of crystal grains appearing on a section of sintered ferrite, i.e., the sectional area of one crystal grain is found.

Then, the diameter of a sphere that gives a great circle of the same area as this sectional area is found. This value is herein defined as the average crystal grain size.

For such measurement, for instance, sintered ferrite is mirror-polished and then etched with hydrochloric acid or the like. A photograph is taken of this etched ferrite under a metal electron microscope of about 500 to 1,000 magnifications. Crystal grains in a range having an area of at least 10,000 ems are counted.

When the inventive manganese-zinc-ferrite core constructed as mentioned above is incorporated as a deflecting yoke in a product, it is possible to reduce heat generation by about 3° C. or less, and especially about 4° C. to about 5° C. as compared with a conventional yoke.

The present invention will now be further explained by reference to certain examples which are provided solely for purposes of illustration and are not intended to be limitative.

EXAMPLE 1

Provided was a material comprising 53 mol % of Fe$_2$O$_3$, 33 mol % of MnO and 14 mol % of ZnO as main components and 0.02% by weight to 0.7% by weight of CaO as a subordinate component.

This material was prepared as follows. First, the main components were weighed and mixed together in the aforesaid composition. The thus mixed powders were calcined for a, given time at 950° C. The thus calcined powders were pulverized with the addition of CaO thereto. The obtained powders were granulated with the addition of polyvinyl alcohol thereto, and the granulated material was formed under pressure to obtain a troidal compact. Thereafter, the compact was fired.

Firing was carried out by heating the compact at a heating rate of 500° C./hour and holding it at the sintering temperature or compact holding high-temperature of 1,320° C. for 1.5 hours. After firing, the compact was cooled at a cooling rate of 600° C./hour. The oxygen concentration was controlled using carbon dioxide that was an off-gas from the heat source or LPG and steam. The oxygen concentration at the compact holding high-temperature was set at 7%. Upon the compact holding step finished, cooling was carried out by introducing air into the firing atmosphere. By the introduction of air, the oxygen concentration of the firing atmosphere became 21% at a temperature of 300° C. or less.

The composition of the thus obtained sintered ferrite samples was analyzed by fluorescence x-ray analysis. Consequently, it was found that the samples have substantially the same composition as that of the as prepared material. Each sample had a toroidal form having an outer diameter of 30 mm, an inner diameter of 20 mm and a height of 8 mm.

Each of the obtained toroidal sintered samples was measured for its magnetic core loss at 100° C. and 100 kHz-200 mT, its saturation flux density at 100° C. and its surface electrical resistance at 500 V. The results are shown in Table 1.

TABLE 1

| Sample No. | CaO (wt %) | Magnetic core loss (kW/m$^3$) 100 kHz-20 mT 100° C. | Saturation flux density (mT) 100° C. | Surface resistance (Ω) 500 V |
|---|---|---|---|---|
| 1 (comp.) | 0.02 | 21.1 | 317 | ≦10$^6$ |
| 2 (inventive) | 0.04 | 10.5 | 310 | 3 × 10$^6$ |
| 3 (inventive) | 0.10 | 3.4 | 306 | 6 × 10$^6$ |
| 4 (inventive) | 0.15 | 2.9 | 301 | 9 × 10$^6$ |
| 5 (inventive) | 0.25 | 3.1 | 285 | 5 × 10$^6$ |
| 6 (inventive) | 0.40 | 3.7 | 280 | 7 × 10$^6$ |
| 7 (inventive) | 0.50 | 4.1 | 276 | 3 × 10$^6$ |
| 8 (inventive) | 0.60 | 6.0 | 274 | 2 × 10$^6$ |
| 9 (comp.) | 0.70 | 13.5 | 268 | ≦10$^6$ |

CaO is effective to form a high resistance layer at the crystal grain boundary of the ferrite core, thereby achieving low magnetic core losses and high surface electrical resistance. As can be predicted from Table 1, when the CaO content of less than 0.04% by weight is applied to such a fabrication process as using rapid cooling at a cooling rate of 600° C./hour, the resistance layer formed at the grain boundary becomes insufficient, resulting in deterioration in magnetic core losses and surface electrical resistance as well. It is also found that when the content of CaO exceeds 0.70% by weight, the magnetic core losses deteriorate and the surface electrical resistance becomes lower due to abnormal growth of crystals. In other words, when the content of CaO is in the range of 0.04% by weight to 0.70% by weight according to the present invention, a high resistance layer can be uniformly formed at the grain boundary with enhanced surface electrical resistance even in such a low-cost fabrication process as using rapid cooling at a cooling rate of 600° C./hour. The increase in resistance of the grain boundary can also reduce eddy-current losses and make some contribution to low magnetic core losses.

Sintered ferrite sample Nos. 1, 4 and 9 were mirror polished and then etched with hydrochloric acid. A photograph was taken of the thus polished surface of each sample under a 500× metal microscope to examine its average crystal grain size d.

The average crystal grain size and crystal grain size distribution were calculated as follows.

A square region of 100 μm×100 μm was drawn on the thus taken photograph to count how many crystal grains were present therein. However, a crystal grain present at the boundary of the region was counted as n=½. Then, the average crystal grain size is found from the following equation:

As a result, $$d=\sqrt{(4/\Pi)\times(2500\,\mu m^2/n)}$$

the average crystal grain sizes of sample Nos. 1 and 9 (comparative) were found to be d=5.88 μm and d=16.34 μm, respectively. On the other hand, the average crystal grain size of sample No. 4 (inventive) was found to be d=6.25 μm.

EXAMPLE 2 (Influence of Added $V_2O_5$)

Materials having similar main component composition as in Example 1 and containing 0.10% by weight of CaO and 0% by weight to 0.225% by weight of $V_2O_5$, as subordinate components were weighed, mixed, calcined, pulverized, and formed as in Example 1. Otherwise, toroidal compacts were obtained as in Example 1. Then, the compacts were fired.

The composition of each of the thus obtained wintered ferrite samples was analyzed by fluorescence x-ray analysis. Consequently, the sample was found to have much the same composition as that of the as-prepared material. Each sample had a toroidal shape having an outer diameter of 30 mm, an inner diameter of 20 mm and a height of 8 mm as in Example 1.

Each of the obtained toroidal wintered samples was measured for its magnetic core loss at 100° C. and 100 kHz-20 mT, its saturation flux density at 100° C. and its surface electrical resistance at 500 V. The results are shown in Table 2.

TABLE 2

| Sample No. | $V_2O_5$ (wt %) | Magnetic core loss (kW/m³) 100 kHz-20 mT 100° C. | Saturation flux density (mT) 100° C. | Surface resistance (Ω) 500 V |
|---|---|---|---|---|
| 11 (inventive) | 0.000 | 3.4 | 306 | 6 × 10⁶ |
| 12 (inventive) | 0.025 | 3.0 | 312 | 6 × 10⁶ |
| 13 (inventive) | 0.050 | 2.7 | 320 | 4 × 10⁶ |
| 14 (inventive) | 0.075 | 2.5 | 324 | 4 × 10⁶ |
| 15 (inventive) | 0.100 | 2.1 | 332 | 4 × 10⁶ |
| 16 (inventive) | 0.125 | 3.2 | 335 | 3 × 10⁶ |
| 17 (inventive) | 0.150 | 4.8 | 342 | 3 × 10⁶ |
| 18 (inventive) | 0.175 | 7.3 | 335 | 3 × 10⁶ |
| 19 (inventive) | 0.200 | 10.4 | 324 | 2 × 10⁶ |
| 20 (comp.) | 0.225 | 13.6 | 317 | 2 × 10⁶ |

As can be predicted from Table 2, $V_2O_5$ is effective to promote the sinterability of the ferrite core and form a high resistance layer at the crystal grain boundary, thereby achieving low magnetic core losses, high saturation flux densities and high surface electrical resistance. As can again be predicted from Table 2, when $V_2O_5$, is used with such a fabrication process as using control of the oxygen concentration with carbon dioxide and steam and rapid cooling at a cooling rate of 600° C./hour, the magnetic core losses can be reduced with increased saturation flux densities. When the content of $V_2O_5$, exceeds 0.20% by weight, the low magnetic core losses deteriorate due to too fast acceleration of crystallization. When the content of $V_2O_5$ is in the range of 0% by weight to 0.20% by weight according to the present invention, high saturation flux densities and low magnetic core losses are achievable even in such a lowcost fabrication process as using control of the oxygen concentration with carbonic acid gas and steam and rapid cooling at a cooling rate of 600° C./hour. In addition, cracks are less likely to occur on the surface of the ferrite core, resulting in high surface electrical resistance.

EXAMPLE 3 (Influence 1 of Cooling Rate)

Materials having such similar main component composition as in Example 1 and containing 0.10% by weight of CaO as a subordinate component were weighed, mixed, calcined, pulverized, and formed as in Example 1.

Firing was carried out as in Example 1 with the exception that the cooling rate was changed to 900° C./hour, 800° C./hour, 600° C./hour, 400° C./hour, 300° C./hour, and 200° C./hour.

Each of the obtained toroidal sintered samples was measured for its magnetic core loss, saturation flux density and surface electrical resistance as in Example 1 as well as the presence of surface cracking. The results are shown in Table 3.

TABLE 3

| Sample No. | Cooling Rate (° C./hr) | Magnetic core loss (kW/m³) 100 kHz-20 mT 100° C. | Saturation flux density (mT) 100° C. | Surface resistance (Ω) 500 V | Surface Cracking |
|---|---|---|---|---|---|
| 21 | 200* | 12.6 | 288 | 1 × 10⁷ | Found |
| 22 | 300 | 5.8 | 296 | 8 × 10⁶ | Not found |
| 23 | 400 | 3.1 | 302 | 5 × 10⁶ | Not found |
| 24 | 600 | 3.4 | 306 | 6 × 10⁶ | Not found |
| 25 | 800 | 2.9 | 306 | 6 × 10⁶ | Not found |
| 26 | 900* | 2.5 | 312 | ≤10⁶ | Not found |

*Deviation from the preferable range of the invention

From Table 3, it can be found that sample No. 21 obtained at a slower cooling rate has much electrical insulating layer and so has higher surface electrical resistance because of a longer surface oxidization treatment time. However, the magnetic core losses deteriorate with surface cracking of the ferrite core because of the formation of too much non-ferrite components. Sample No. 26 obtained at too fast a cooling rate, on the other hand, has lower magnetic core losses with no surface cracking because of the formation of less electrical insulating layer. However, the surface electrical resistance becomes lower. Sample Nos. 22 to 25 obtained in the proper cooling rate range according to the present invention, on the contrast, provide surface crack-free, manganese-zinc-ferrite cores of high surface electrical resistance because suitable electrical insulating layers are formed with low magnetic core losses.

EXAMPLE 4 (Influence 2 of Cooling Rate)

Materials having such similar main component composition as in Example 1 and containing 0.10% by weight of CaO and 0.10% by weight of $V_2O_5$ as subordinate components were weighed, mixed, calcined, pulverized, and formed as in Example 1.

Firing was carried out as in Example 1 with the exception that the cooling rate was changed to 700° C./hour, 600° C./hour, 400° C./hour, 300° C./hour, 250° C./hour, and 200° C./hour.

Each of the obtained toroidal sintered samples was measured for its magnetic core loss, saturation flux density and surface electrical resistance as in Example 1 as well as the presence of surface cracking. The results are shown in Table 4.

TABLE 4

| Sample No. | Cooling Rate (° C./hr) | Magnetic core loss (kW/m³) 100 kHz-20 mT 100° C. | Saturation flux density (mT) 100° C. | Surface resistance (Ω) 500 V | Surface Cracking |
|---|---|---|---|---|---|
| 31 | 200* | 12.6 | 311 | $1 \times 10^7$ | Found |
| 32 | 250 | 8.7 | 315 | $1 \times 10^7$ | Not found |
| 33 | 300 | 4.5 | 320 | $6 \times 10^6$ | Not found |
| 34 | 400 | 3.1 | 326 | $5 \times 10^6$ | Not found |
| 35 | 600 | 2.1 | 332 | $4 \times 10^6$ | Not found |
| 36 | 800 | 1.8 | 340 | $2 \times 10^6$ | Not found |
| 37 | 900* | 1.6 | 345 | $\leq 10^6$ | Not found |

*Deviation form the preferable range of the invention

From Table 4, it can be understood that sample No. 31 obtained at a slower cooling rate of 250° C./hour has much electrical insulating layer and so has higher surface electrical resistance because of a longer surface oxidization treatment time. However, the magnetic core losses deteriorate with surface cracking of the ferrite core because of the formation of too much non-ferrite components. Sample No. 37 obtained at too fast a cooling rate of at least 900° C./hour, on the other hand, has lower magnetic core losses with no surface cracking because of the formation of less electrical insulating layer. However, the surface electrical resistance becomes lower. Sample Nos. 32 to 36 obtained in the proper cooling rate range according to the present invention, on the contrast, provide surface crackfree, manganese-zinc-ferrite cores of high surface electrical resistance because suitable electrical insulating layers are formed with low magnetic core losses.

EXAMPLE 5 (Influence of Oxygen Concentration)

Materials having such similar main component composition as in Example 1 and containing 0.10% by weight of CaO as a subordinate component were weighed, mixed, calcined, pulverized, and formed as in Example 1.

Firing was carried out as in Example 1 with the exception that the oxygen concentration at the high temperature holding step was set at 3%, 5%, 7%, 10%, 15%, and 21%. By the introduction of air at the cooling step, the oxygen concentration became 21% at 300° C. or lower, as already explained. To obtain an oxygen content exceeding 21%, a special supply of oxygen was needed and, hence, no experimentation was performed at such a high oxygen concentration due to some added cost. For this reason, such high oxygen concentrations are excluded from the range of the present invention.

Each of the obtained toroidal sintered samples was measured for its magnetic core loss, saturation flux density and surface electrical resistance as well as the presence of surface cracking, as in Example 2. The results are shown in Table 5. As in the foregoing examples, the oxygen concentration of the firing atmosphere was controlled with carbon dioxide and steam.

TABLE 5

| Sample No. | O₂ conc. (%) | Magnetic core loss (kW/m³) 100 kHz-20 mT 100° C. | Saturation flux density (mT) 100° C. | Surface resistance (Ω) 500 V |
|---|---|---|---|---|
| 41 (comp.) | 3 | 2.8 | 310 | $\leq 10^6$ |
| 42 (inventive) | 5 | 3.3 | 306 | $3 \times 10^6$ |
| 43 (inventive) | 7 | 3.4 | 306 | $6 \times 10^6$ |
| 44 (inventive) | 10 | 4.8 | 300 | $5 \times 10^6$ |
| 45 (inventive) | 15 | 7.5 | 296 | $8 \times 10^6$ |
| 46 (inventive) | 21 | 9.8 | 292 | $1 \times 10^7$ |

From Table 5, it can be found that when the oxygen concentration of less than 5% is applied to such a fabrication process as using rapid cooling at a cooling rate of 600° C./hour, low magnetic core losses are obtainable due to a reduced amount of oxygen and, hence, the formation of less electrical insulating layer. However, there is a surface electrical resistance drop.

According to the present invention, it is thus possible to obtain a manganese-zinc-ferrite core comprising 50 mol % or more of $Fe_2O_3$, which can be rapidly fabricated at low cost yet with high saturation flux densities, low magnetic core losses and surface electrical resistance high enough to prevent surface cracking.

According to the present invention wherein the electrical insulating layer can be formed on the surface of the core during rapid cooling at a cooling rate of 250° C./hour to 850° C./hour and preferably 300° C./hour to 850° C./hour, it is possible to reduce the core fabrication time largely. For instance, such a temperature drop of 250° C./hour and preferably 300° C./hour can be achieved for a little more than 1 hour at most. This means that at the rate of 250° C./hour, the treating time becomes about ⅓ of the conventional time of about 4.7 hours while the cooling time becomes about ⅗, and at the rate of 300° C./hour, the treating time becomes about ¼ while the cooling time becomes about ½. It is thus possible to achieve remarkable reductions in core fabrication cost. The higher the cooling rate and the lower the concentration of oxygen at the cooling step, the smaller the amount of oxidization is. Under the conditions according to the present invention, the cooling rate becomes high and the oxygen concentration becomes low. The electrical insulating layer formed under such conditions has little or no risk of cracking. The insulating layer can also maintain low magnetic core losses due to the small amount of oxidization.

The electrical insulating layer formed within such a very short time period as mentioned above may possibly be insufficient in terms of electrical insulation or may possibly fail to have sufficiently high resistance. With the present invention, however, sufficient insulation to ensure interwinding insulation is obtainable because the aforesaid amount of CaO is added into the ferrite as the subordinate component.

The manganese-zinc-ferrite core obtained according to the fabrication process of the present invention can thus have a high surface electrical resistance of $1 \times 10^6$ Ω or greater and preferably $1 \times 10^6$ Ω to $1 \times 10^{10}$ Ω at 500 V, a low magnetic core loss of 12 kW/m³ or less and preferably 1 kW/m³ to 10 kW/m³ at 100° C. and 100 kHz-20 mT and a high saturation flux density of 270 mT or greater and preferably 300 mT to 400 mT at 100° C.

Especially in the process of the present invention, the oxygen concentration of the burning atmosphere can be controlled with carbon dioxide that is a combustion off gas used as the heat source and steam, i.e., without recourse to the introduction of nitrogen gas, thereby achieving cost reductions.

Having described the present invention, it will be apparent that many changes and modifications may be made to the above-described embodiments without departing from the spirit and the scope of the present invention.

What is claimed is:

1. A process of fabricating a manganese-zinc-ferrite core, which comprises forming manganese-zinc-ferrite into a given core shape, firing a core compact in a firing atmosphere having an oxygen concentration controlled by carbon dioxide and steam, and cooling said core compact at a cooling rate of about 50° C./hour to 850° C./hour, wherein said manganese-zinc-ferrite contains calcium oxide as a subordinate component in an amount of 0.04% by weight to 0.6% by weight as calculated on a CaO basis; wherein the oxygen concentration of the firing atmosphere controlled by said carbon dioxide and steam is between 5% and 21%.

2. The process of claim 1, wherein said cooling rate is between about 250° C./hour and 850° C./hour.

3. The process of claim 1, wherein said manganese-zinc-ferrite contains iron oxide as a main component in an amount of 50 mol % or greater as calculated on an $Fe_2O_3$ basis.

4. The process of claim 1, wherein said manganese-zinc-ferrite further contains vanadium oxide as a subordinate component in an amount of up to 0.2% by weight as calculated on a $V_2O_5$ basis.

5. The process of claim 1, wherein said rapid cooling is carried out by introducing air into said firing atmosphere.

6. The process of claim 1, wherein a combustion off-gas from a heat source is used as said carbon dioxide.

7. The process of claim 3, wherein said manganese-zinc-ferrite contains iron oxide in an amount of 50.5 to 54 mol %.

8. The process of claim 7, wherein said manganese-zinc-ferrite contains iron oxide in an amount of 51.5 to 53.5 mol %.

9. The process of claim 1, wherein said manganese-zinc-ferrite contains zinc oxide in an amount of 7 to 21 mol %.

10. The process of claim 9, wherein said manganese-zinc-ferrite contains zinc oxide in an amount of 12 to 17 mol %.

11. The process of claim 4, wherein said manganese-zinc-ferrite contains vanadium oxide in an amount of from 0.025% to 0.15% by weight.

12. The process of claim 1, wherein said oxygen concentration of said firing atmosphere is between 5% and 15%.

13. The process of claim 12, wherein said oxygen concentration of said firing atmosphere is between 5% and 10%.

14. A manganese-zinc-ferrite core produced by the process of claim 1, which core has a surface electrical resistance of $1 \times 10^6$ Ω or greater at 500 V and a magnetic core loss of 12 kW/m$^3$ or less at 100° C. and 100 KHz-20 mT, said manganese-zinc-ferrite core having an average crystal grain size of 15 μm or less.

15. The manganese-zinc ferrite core of claim 14, having a surface electrical resistance of $2 \times 10^6$ Ω or greater at 500 V.

16. The manganese-zinc ferrite core of claim 14, having a magnetic core loss of 10.5 kW/m$^3$ or less at 100° C.

* * * * *